(12) United States Patent
Wu

(10) Patent No.: US 11,767,416 B1
(45) Date of Patent: Sep. 26, 2023

(54) GRAPHENE COMPOSITE PLASTIC AND PREPARATION METHOD THEREOF

(71) Applicant: Zhongshan Huayang Plastic Dyestuffs Co., Ltd., Zhongshan (CN)

(72) Inventor: Zhou Wu, Zhongshan (CN)

(*) Notice: Subject to any disclaimer, the term of this patent is extended or adjusted under 35 U.S.C. 154(b) by 0 days.

(21) Appl. No.: 18/095,031

(22) Filed: Jan. 10, 2023

(30) Foreign Application Priority Data

Apr. 7, 2022 (CN) .......................... 202210361824.6

(51) Int. Cl.
*C08K 13/06* (2006.01)
*C08K 3/04* (2006.01)
*C08L 23/12* (2006.01)

(52) U.S. Cl.
CPC .............. *C08K 13/06* (2013.01); *C08K 3/042* (2017.05); *C08L 23/12* (2013.01)

(58) Field of Classification Search
CPC ................................ C08K 3/042; C08L 23/12
See application file for complete search history.

(56) References Cited

FOREIGN PATENT DOCUMENTS

| CN | 107057192 A | 8/2017 |
| CN | 109054306 A | 12/2018 |
| CN | 113773583 A | * 12/2021 |

OTHER PUBLICATIONS

Machine translation of CN 109054306 A, published Dec. 21, 2018.*
Machine translation of CN 113773583 A, published Dec. 10, 2021.*

* cited by examiner

*Primary Examiner* — Vickey Nerangis
(74) *Attorney, Agent, or Firm* — Jose Cherson Weissbrot

(57) ABSTRACT

The present disclosure provides a graphene composite plastic for heat dissipation, comprising 10%-85% of carrier resin, 10%-85% of modified graphene, 1%-10% of lubricant, 1%-5% of coupling agent and a stabilizer. The present disclosure also provides a method for preparing the above graphene composite plastic.

5 Claims, No Drawings

GRAPHENE COMPOSITE PLASTIC AND PREPARATION METHOD THEREOF

CROSS-REFERENCE TO RELATED APPLICATIONS

The present application is based upon and claims priority to Chinese patent application No. 202210361824.6, filed on Apr. 7, 2022, the entire content of which is incorporated herein by reference.

TECHNICAL FIELD

The present disclosure relates to the technical field of plastic preparation, particularly to a graphene composite plastic for heat dissipation and a preparation method thereof.

BACKGROUND

In the field of heat conduction and heat dissipation, graphene is often used as a filler of a heat-conducting film, a heat-conducting polymer composite and a heat-dissipation coating. The graphene has extremely high heat conductivity and simultaneously has extremely high thermal radiation emissivity, thus the graphene has the characteristics of both heat conduction and heat radiation. In the heat-conducting materials, the graphene, as a heat-conducting filler, can be evenly distributed in a matrix to build a heat-conducting network through interconnection, so that heat is transferred along the heat-conducting network, thereby greatly improving the efficiency. In the thermal radiation paint, the graphene has a large specific surface area and high emissivity, so it can quickly exchange the heat transferred by heat conduction to the environment in time.

China Patent Publication No. CN 110617453A discloses an electric vehicle LED headlamp with a graphene heat-conducting plastic structure for heat dissipation, and relates to the field of electric vehicle headlamps. The electric vehicle LED headlamp includes a lamp holder, an aluminum substrate, at least one LED chip, a lens and a lampshade, wherein, at least one LED chip is stuck to one side of the aluminum substrate and fixedly connected to the aluminum substrate, the other side of the aluminum substrate is stuck to the inner wall of the lamp holder through silicone grease, and the aluminum substrate is fixedly connected to the lamp holder; the lens is fixedly connected to the lamp holder, the aluminum substrate and at least one LED chip are covered between the lens and the lamp holder, the lamp cover is fixedly connected to the lamp holder, and the lens is covered between the lamp cover and the lamp holder; a plurality of radiating fins are arranged on the outer wall surface of the lamp holder that is opposite to the other side of the aluminum substrate, and the plurality of radiating fins and the lamp holder are integrally molded parts made of graphene phenolic resin materials through integrated thermoplastic molding. The electric vehicle LED headlamp of this disclosure has good heat dissipation effect and is easy to manufacture.

China Patent Publication No. CN 110745019A discloses an electric vehicle charger with graphene heat-conducting plastic structure for heat dissipation. The charger housing comprises a charger body and a charger housing, wherein a plurality of grooves and bulges are alternately arranged on the surface of the charger housing, and the charger housing is an integral molding body made of graphene heat-conducting phenolic molding compound. Where, a graphene heat-conducting phenolic molding compound is mainly made of a phenolic resin and porous edge graphene oxide nano chip, so that the charger housing has excellent impact strength and heat dissipation performance.

However, the graphene added in the existing graphene composite is usually bonded into coarse particles with adhesives. The materials made are very brittle, cannot be molded by an injection molding process, and can only be pressed by hydraulic press. Therefore, this graphene composite can only be used for preparing products with a wall thickness of more than 4 mm, but cannot be applied to products with relatively simple structures, such as projectors, downlights and radiators. Moreover, the molding circumference of each mold is too long, it takes more than 20 minutes to make a first mock examination, so the economic benefit is not high. The capacity of the other existing graphene heat-dissipating plastics in the market is also relatively limited.

SUMMARY

In view of the above defects in the prior art, the technical solution to be solved by the present disclosure is to provide a graphene composite plastic for heat dissipation that is capable of improving the dispersibility of graphene and a preparation method thereof.

The first embodiment of the present disclosure provides a graphene composite plastic for heat dissipation, comprising the following raw materials:

10-85% of carrier resin, 10-85% of modified graphene, 1-10% of lubricant, 1-5% of coupling agent and a stabilizer.

Graphene, as an emerging heat-dissipation filler, has excellent mechanical property, extremely high electron mobility and relatively large aspect ratio. If the graphene is filled into a plastic matrix, a high-conductivity low-percolation-concentration plastic can be obtained. Especially, since the graphene has a relatively large transverse size and a unique two-dimensional plane structure, it is much easier to disperse into the polymer matrix compared with a carbon nanotube. The graphene not only plays an important role in conductivity, but also shows great application prospects in developing high heat-conducting polymer composites. Since the graphene is transmitted by phonons so that it has extremely high heat conductivity, the heat conductivity of the plastic can reach from 0.1-0.5 W/(m·K) to 5-10 W/(m·K) after the graphene is added into the plastic with increase of more than 10 times, so that the plastic can be applied to the fields such as heat dissipation parts of light-emitting diode (LED) lamps, heat dissipation parts of automobiles and heat dissipation shells of electronics to replace a part of commonly used heat dissipation materials such as metal aluminum, thereby propelling the weight reduction of devices.

The carrier resin comprises at least one of a polyamide (PA) resin, polypropylene (PP) resin and a polycarbonate (PC) resin.

The lubricant is stearic acid or paraffin.

The coupling agent is γ-(2,3-epoxypropoxy)propyltrimethoxysilane or isobutyl triethoxysilane.

The stabilizing agent is dibasic lead phosphite.

In order to obtain the required heat conductivity of the composite when the graphene is added to plastics to prepare heat dissipation materials, a key factor is to realize the uniform dispersion of the graphene at a polymer matrix interface and enhance the interface interaction. However, since there is strong π-π interaction between graphene sheets, the graphene is easily agglomerated in the polymer, and the weak van der Waals force between graphene and the polymer causes weak interaction with each other. In addition, phonon scattering will reduce the thermal conductivity of the composite to some extent. Therefore, the graphene needs to be further treated to improve its dispersion in plastic matrix materials.

Further, the graphene composite plastic for heat dissipation comprises the following components (by weigh percent):

10%-85% of carrier resin, 10%-85% of modified graphene, 1%-10% of lubricant, 1% 5% of coupling agent and a stabilizer.

Preferably, the graphene composite plastic for heat dissipation comprises the following components (by weigh percent): 10%-85% of carrier resin, 10%-85% of modified graphene, 4%-7% of lubricant, 2%-4% of coupling agent and 3%-6% of stabilizer.

Still preferably, the graphene composite plastic for heat dissipation comprises the following components (by weigh percent): 50%-60% of carrier resin, 30%-40% of modified graphene, 4%-7% of lubricant, 2%-4% of coupling agent and 3%-6% of stabilizer.

The modified graphene is prepared by the following method:

S1, dissolving 20-30 mol of 1-vinyl-3-butyl imidazole tetrafluoroborate and 0.4-0.6 mmol of azobisisoheptonitrile into 600-800 mL of N,N-dimethylformamide, heating to 75-80° C. in an argon atmosphere, then condensing and refluxing, stirring for 20-24 h for polymerization reaction, adding 50-100 mL of acetone after the reaction is completed, centrifuging for 10-15 min at 3000-3500 rpm, filtering, and collecting precipitates to obtain a polymer;

S2, dispersing 10-80 g of graphene into 30-40 L of N,N-dimethylformamide and performing ultrasonic treatment for 10-15 min, then adding 1-3 g of polymer prepared in step S1 and performing ultrasonic treatment for 20-30 min, then adding 12-15 mg of azobisisoheptonitrile, heating to 65-75° C., reacting for 20-24 h, centrifuging for 15-20 min at 4000-4500 rpm after the reaction is ended, filtering, collecting solids, washing the solids with water 3-5 times and then drying for 8-10 h at 50-60° C. to obtain the modified graphene.

Preferably, the graphene composite plastic for heat dissipation comprises the following raw materials:

50-60% of carrier resin, 30-40% of modified graphene, 4-7% of lubricant, 2-4% of coupling agent and 3-6% of stabilizer.

The modified graphene is prepared by the following method:

S1, dissolving 20-30 mol of 1-vinyl-3-butyl imidazole tetrafluoroborate and 0.4-0.6 mmol of azobisisoheptonitrile into 600-800 mL of N,N-dimethylformamide, heating to 75-80° C. in an argon atmosphere, then condensing and refluxing, stirring for 20-24 h for polymerization reaction, adding 50-100 mL of acetone after the reaction is completed, centrifuging for 10-15 min at 3000-35000 rpm, filtering, and collecting precipitates to obtain a polymer;

S2, dispersing 10-80 g of graphene into 30-40 L of N,N-dimethylformamide and performing ultrasonic treatment for 10-15 min, then adding 1-3 g of polymer prepared in step S1 and performing ultrasonic treatment for 20-30 min, then adding 12-15 mg of azobisisoheptonitrile, heating to 65-75° C., reacting for 20-24 h, centrifuging for 15-20 min at 4000-4500 rpm after the reaction is ended, filtering, collecting solids, washing the solids with water 3-5 times and then drying for 8-10 h at 50-60° C. to obtain the graphene polymer.

S3, adding 10-12 L of water into the graphene polymer prepared in step S2 for 25-30 min of ultrasonic treatment to obtain a graphene polymer suspension, dissolving 1.1-1.3 g of $NaNO_2$ into 1.2-1.5 L of water, cooling to 0-5° C., adding 2.8-3.2 g of p-aminobenzenesulfonic acid and 50-80 mL of 0.5-1 mol/L HCl solution to be mixed with the above graphene polymer suspension, reacting for 2-3 h in ice water bath, then reacting again for 2-3 h at room temperature, centrifuging for 5-8 min at 10000-12000 rpm after the reaction is completed, washing the solid with water to be neutral so as to obtain the modified graphene.

In the prior art, since the formula and process for blending granulation of the graphene and carrier resin have extremely high difficulty so granules are difficultly formed. If the content of graphene is low, the graphene can be formed but cannot achieve the heat dissipation effect. If the content of graphene is high, the graphene can achieve the heat dissipation effect but cannot be formed by granulation. In addition, the existing graphene composite plastic can only be pressed and molded by a hydraulic machine. Because the material is too fragile, it cannot be molded by an injection molding process, and the product has a thickness of more than 5 mm, and the preparation cycle of the product per mold is more than 30 minutes. This product has no economic value, cannot fully achieve mass produced, and cannot be used for injection molding to produce a projector shell, an injection downlight shell, an injection molding radiator, etc. These products are mainly used to replace aluminum die-casting products. In the present disclosure, 1-vinyl-3-butyl imidazolium tetrafluoroborate is combined with graphene through in-situ free radical polymerization to be attached to the surface of graphene. Meanwhile, to this end, the graphene polymer is further treated with $NaNO_2$ and p-aminobenzenesulfonic acid, so that graphene can be uniformly mixed in the carrier resin, and the integrity of the graphene surface structure can be maintained. The graphene composite plastic prepared by the embodiment of the present disclosure can create particles through the twin-screw granulation mechanism; and it can be molded by injection molding process. The prepared graphene composite plastic has high thermal conductivity, good tensile property and thermal stability, and is suitable for injection molding projection lamp shell, injection molding downlight shell, injection molding radiator, etc.

DETAILED DESCRIPTION OF THE EMBODIMENTS

Various raw materials in examples:
Graphene (D50<10.0 μm), from Shanghai Fuqi Industry and Trade Co., Ltd.
1-Vinyl-3-butyl imidazole tetrafluoroborate, CAS1033461-44-7, Wuhan Prov Biotechnology Co., Ltd.

Example 1

The preparation of a graphene composite plastic for heat dissipation comprises the following steps:

60 g of polypropylene resin, 40 g of modified graphene, 4 g of stearic acid, 4 g of γ-(2,3-epoxypropoxy)propyltrimethoxysilane and 5 g of dibasic lead phosphite were weighed and mixed for 15 min at 110° C., then the material obtained after mixing was cooled to 40° C., placed at room temperature for 36 hours and finally the above material was delivered to a twin-screw granulator for granulation, and then the material obtained after granulation was molded by an injection molding machine to obtain the graphene composite plastic for heat dissipation.

The modified graphene is prepared by using the following method:

S1, 30 mol of 1-vinyl-3-butyl imidazolium tetrafluoroborate and 0.5 mmol of azobisisoheptonitrile were weighed and dissolved into 800 mL of N,N-dimethylformamide, and the above mixture was heated to 80° C. in an argon atmosphere, condensed and refluxed and then magnetically stirred for 24 h for polymerization reaction. After the reaction was completed, 80 mL of acetone was added, the above mixture was centrifuged for 10 min at 3500 rpm and filtered, and then the precipitate was collected to obtain a polymer;

S2, 50 g of graphene was dispersed into 40 L of N, N-dimethylformamide and subjected to ultrasonic treatment for 15 min, then 3 g of polymer prepared in step S1 was added, and the above materials were subjected to ultrasonic treatment for 30 min, then 15 mg of azodiisobeptonitrile was added, and the above materials were heated to 75° C. to react for 24 h. After the reaction was completed, the reaction product was centrifuged for 15 min at 4500 rpm and filtered, subsequently the solid was collected, washed with water for 5 times and then dried for 10 h at 55° C. to obtain the modified graphene.

Example 2

The preparation of a graphene composite plastic for heat dissipation comprises the following steps:

The modified graphene was prepared according to the following method:

S1, 30 mol of 1-vinyl-3-butyl imidazolium tetrafluoroborate and 0.5 mmol of azobisisoheptonitrile were weighed and dissolved into 800 mL of N, N-dimethylformamide, and the above mixture was heated to 80° C. in an argon atmosphere, condensed and refluxed and then magnetically stirred for 24 h for polymerization reaction. After the reaction was completed, 80 mL of acetone was added, the above mixture was centrifuged for 10 min at 3500 rpm and filtered, and then the precipitate was collected to obtain a polymer;

S2, 50 g of graphene was dispersed into 40 L of N, N-dimethylformamide and subjected to ultrasonic treatment for 15 min. then 3 g of polymer prepared in step S1 was added, and the above materials were subjected to ultrasonic treatment for 30 min, then 15 mg of azodiisobeptonitrile was added, and the above materials were heated to 75° C. to react for 24 h. After the reaction was completed, the reaction product was centrifuged for 15 min at 4500 rpm and filtered, subsequently the solid was collected, washed with water for 5 times and then dried for 10 h at 55° C. to obtain the graphene polymer.

S3, the graphene polymer prepared in step S2 was added into 12 L of water, then subjected to ultrasonic treatment for 30 min to obtain a graphene polymer suspension, then 1.25 g of NaNO$_2$ was weighed and dissolved into 1.3 L of water, the above mixture was cooled to 4° C. followed by adding 3.1 g of p-aminobenzenesulfonic acid and 50 mL of 1 mol/L HCl solution, then the above materials were mixed with the foregoing graphene polymer suspension to react for 2 h in ice water bath and then react for 3 h again at room temperature. After the reaction was completed, the reaction product was centrifuged for 5 min at 12000 rpm, and the solid was collected and washed with water to be neutral to obtain the modified graphene.

60 g of polypropylene resin, 40 g of modified graphene prepared by the above method, 4 g of stearic acid, 4 g of γ-(2,3-epoxypropoxy)propyltrimethoxysilane, 5 g of dibasic lead phosphite were weighed, the above components were mixed for 15 min at 110° C., then the material obtained after mixing was cooled to 40° C., placed for 36 hours at room temperature and finally delivered to a twin-screw granulator for granulation, and then the product obtained by granulation was molded by an injection molding machine to produce the graphene composite plastic for heat dissipation.

Example 3

50 g of graphene was added into 12 L of water to subject to ultrasonic treatment for 30 min to obtain a graphene polymer suspension, then 1.25 g of NaNO$_2$ was weighed and dissolved into 1.3 L of water, the above mixture was cooled to 4° C. followed by adding 3.1 g of p-aminobenzenesulfonic acid and 50 mL of 1 mol/L HCl solution, then the above materials were mixed with the foregoing graphene polymer suspension to react for 2 h in ice water bath and then react for 3 h again at room temperature. After the reaction was completed, the reaction product was centrifuged for 5 min at 12000 rpm, and the solid was collected and washed with water to be neutral to obtain the modified graphene.

The preparation of a graphene composite plastic for heat dissipation comprises the following steps:

60 g of polypropylene resin, 40 g of modified graphene prepared by the above method, 4 g of stearic acid, 4 g of γ-(2,3-epoxypropoxy)propyltrimethoxysilane and 5 g of dibasic lead phosphite were weighed and mixed for 15 min at 110° C., then the material obtained after mixing was cooled to 40° C., placed at room temperature for 36 hours and finally the above material was delivered to a twin-screw granulator for granulation, and then the material obtained after granulation was molded by an injection molding machine to obtain the graphene composite plastic for heat dissipation.

Example 4

The modified graphene was prepared by using the following method:

S1, 20 mol of 1-vinyl-3-butyl imidazolium tetrafluoroborate and 0.5 mmol of azobisisoheptonitrile were weighed and dissolved into 800 mL of N, N-dimethylformamide, and the above mixture was heated to 80° C. in an argon atmosphere, condensed and refluxed and then magnetically stirred for 24 h for polymerization reaction. After the reaction was completed, 80 mL of acetone was added, the above mixture was centrifuged for 10 min at 3500 rpm and filtered, and then the precipitate was collected to obtain a polymer;

S2, 50 g of graphene was dispersed into 40 L of N, N-dimethylformamide and subjected to ultrasonic treatment for 15 min. then 3 g of polymer prepared in step S1 was added, and the above materials were subjected to ultrasonic treatment for 30 min, then 15 mg of azodiisobeptonitrile was added, and the above materials were heated to 75° C. to react for 24 h. After the reaction was completed, the reaction product was centrifuged for 15 min at 4500 rpm and filtered, subsequently the solid was collected, washed with water for 5 times and then dried for 10 h at 55° C. to obtain the graphene polymer.

S3, the graphene polymer prepared in step S2 was added into 12 L of water to subject to ultrasonic treatment for 30 min to obtain a graphene polymer suspension, then 1.25 g of $NaNO_2$ was weighed and dissolved into 1.3 L of water, the above mixture was cooled to 4° C. followed by adding 3.1 g of p-aminobenzenesulfonic acid and 50 mL of 1 moUL HCl solution, then the above materials were mixed with the foregoing graphene polymer suspension to react for 2 h in ice water bath and then react for 3 h again at room temperature. After the reaction was completed, the reaction product was centrifuged for 5 min at 12000 rpm, and the solid was collected and washed with water to be neutral to obtain the modified graphene.

The preparation of a graphene composite plastic for heat dissipation comprises the following steps:

60 g of polypropylene resin, 40 g of modified graphene prepared by the above method, 4 g of stearic acid, 4 g of γ-(2,3-epoxypropoxy)propyltrimethoxysilane, 5 g of dibasic lead phosphite were weighed, the above components were mixed for 15 min at 110° C., then the material obtained after mixing was cooled to 40° C., placed for 36 hours at room temperature and finally delivered to a twin-screw granulator for granulation, and then the product obtained by granulation was molded by an injection molding machine to produce the graphene composite plastic for heat dissipation.

Example 5

The graphene is prepared by using the following steps:
S1, 30 mol of 1-vinyl-3-butyl imidazolium tetrafluoroborate and 0.5 mmol of azobisisoheptonitrile were weighed and dissolved into 800 mL of N, N-dimethylformamide, and the above mixture was heated to 80° C. in an argon atmosphere, condensed and refluxed and then magnetically stirred for 24 h for polymerization reaction. After the reaction was completed, 80 mL of acetone was added, the above mixture was centrifuged for 10 min at 3500 rpm and filtered, and then the precipitate was collected to obtain a polymer;

S2, 50 g of graphene was dispersed into 40 L of N, N-dimethylformamide and subjected to ultrasonic treatment for 15 min, then 3 g of polymer prepared in step S1 was added, and the above materials were subjected to ultrasonic treatment for 30 min, then 15 mg of azodiisobeptonitrile was added, and the above materials were heated to 75° C. to react for 24 h. After the reaction was completed, the reaction product was centrifuged for 15 min at 4500 rpm and filtered, subsequently the solid was collected, washed with water for 5 times and then dried for 10 h at 55° C. to obtain the graphene polymer.

S3, the graphene polymer prepared in step S2 was added into 12 L of water to subject to ultrasonic treatment for 30 min to obtain a graphene polymer suspension, then 1.1 g of $NaNO_2$ was weighed and dissolved into 1.3 L of water, the above mixture was cooled to 4° C. followed by adding 3.1 g of p-aminobenzenesulfonic acid and 50 mL of 1 mol/L HCl solution, then the above materials were mixed with the foregoing graphene polymer suspension to react for 2 h in ice water bath and then react for 3 h again at room temperature. After the reaction was completed, the reaction product was centrifuged for 5 min at 12000 rpm, and the solid was collected and washed with water to be neutral to obtain the modified graphene.

The preparation of a graphene composite plastic for heat dissipation comprises the following steps:

60 g of polypropylene resin, 40 g of modified graphene prepared by the above method, 4 g of stearic acid, 4 g of γ-(2,3-epoxypropoxy)propyltrimethoxysilane and 5 g of dibasic lead phosphite were weighed, the above components were mixed for 15 min at 110° C., then the material obtained after mixing was cooled to 40° C., placed for 36 hours at room temperature and finally delivered to a twin-screw granulator for granulation, and then the product obtained by granulation was molded by an injection molding machine to produce the graphene composite plastic for heat dissipation.

Example 6

The graphene is prepared by using the following steps:
S1, 30 mol of 1-vinyl-3-butyl imidazolium tetrafluoroborate and 0.5 mmol of azobisisoheptonitrile were weighed and dissolved into 800 mL of N, N-dimethylformamide, and the above mixture was heated to 80° C. in an argon atmosphere, condensed and refluxed and then magnetically stirred for 24 h for polymerization reaction. After the reaction was completed, 80 mL of acetone was added, the above mixture was centrifuged for 10 min at 3500 rpm and filtered, and then the precipitate was collected to obtain a polymer;

S2, 50 g of graphene was dispersed into 40 L of N, N-dimethylformamide and subjected to ultrasonic treatment for 15 min, then 3 g of polymer prepared in step S1 was added, and the above materials were subjected to ultrasonic treatment for 30 min, then 15 mg of azodiisobeptonitrile was added, and the above materials were heated to 75° C. to react for 24 h. After the reaction was completed, the reaction product was centrifuged for 15 min at 4500 rpm and filtered, subsequently the solid was collected, washed with water for 5 times and then dried for 10 h at 55° C. to obtain the graphene polymer;

S3, the graphene polymer prepared in step S2 was added into 12 L of water to subject to ultrasonic treatment for 30 min to obtain a graphene polymer suspension, then 1.25 g of $NaNO_2$ was weighed and dissolved into 1.3 L of water, the above mixture was cooled to 4° C. followed by adding 3.2 g of p-aminobenzenesulfonic acid and 50 mL of 1 mol/L HCl solution, then the above materials were mixed with the foregoing graphene polymer suspension to react for 2 h in ice water bath and then react for 3 h again at room temperature. After the reaction was completed, the reaction product was centrifuged for 5 mm at 12000 rpm, and the solid was collected and washed with water to be neutral to obtain the modified graphene.

The preparation of a graphene composite plastic for heat dissipation comprises the following steps:

60 g of polypropylene resin, 40 g of modified graphene prepared by the above method, 4 g of stearic acid, 4 g of γ-(2,3-epoxypropoxy)propyltrimethoxysilane and 5 g of dibasic lead phosphite were weighed, the above components were mixed for 15 min at 110° C., then the material obtained after mixing was cooled to 40° C., placed for 36 hours at room temperature and finally delivered to a twin-screw granulator for granulation, and then the product obtained by granulation was molded by an injection molding machine to produce the graphene composite plastic for heat dissipation.

Comparative Example 1

The preparation of a plastic comprises the following steps:

60 g of polypropylene resin, 4 g of stearic acid, 4 g of γ-(2,3-epoxypropoxy)propyltrimethoxysilan and 5 g of dibasic lead phosphite were weighed and mixed for 15 min at 110° C., and then the mixture was cooled to 40° C. and placed for 36 hours at room temperature and finally delivered to a twin-screw granulator for granulation, and then molded through an injection molding machine to obtain the plastic.

Comparative Example 2

The preparation of a plastic comprises the following steps:

60 g of polypropylene resin, 4 g of stearic acid, 4 g of γ-(2,3-epoxypropoxv)propyltrimethoxysilan and 5 g of dibasic lead phosphite were weighed and mixed for 15 min at 110° C., and then the mixture was cooled to 40° C., placed for 36 hours at room temperature. The product obtained after granulation was loose and cannot be subjected to injection molding.

Test Example 1

A thermogravimetric analysis test was performed on the graphene composite plastic prepared in examples 1-6 and comparative example 1. On a TG209F1 thermogravimetric analyzer, the temperature was raised from 30° C. to 600° C. at the rate of 10° C./min under $N_2$ to obtain the thermogravimetric curve of the composite plastic. The initial thermal decomposition temperature Ti in thermal decomposition and the thermal degradation temperature $T_{50\%}$ when the mass loss was 50% were recorded. Test results are seen in Table 1.

TABLE 1

Test results of thermal degradation of graphene composite plastic

| Examples | $T_i$/° C. | $T_{50\%}$/° C. |
|---|---|---|
| Example 1 | 307.1 | 494.8 |
| Example 2 | 315.9 | 502.2 |
| Example 3 | 302.6 | 488.6 |
| Example 4 | 310.5 | 496.1 |
| Example S | 311.3 | 497.6 |
| Example 6 | 311.6 | 497.2 |
| Comparative Example 1 | 223.0 | 401.1 |

It can be seen from Table 1 that the graphene is modified with 1-vinyl 3-butyl imidazolium tetrafluoroborate and then prepared into the composite plastic, in such the way, the thermal stability of the plastic can be significantly improved. The dispersion of the modified graphene in a polypropylene matrix is significantly improved, the interface contact area of the two materials is significantly increased, and a new interaction is formed. Because the interaction between the two materials is enhanced, and the stability is also improved, thereby effectively preventing the heat transfer in the interface channel of the composite, and improving the overall thermal stability of the composite plastic. It can be found from Comparative Example 1 and Comparative Example 2 that the further sulfonation of the graphene polymer on the basis of Example 1 can enhance the interaction between the interfaces of the two substances and jointly stabilize the internal structure of the composite plastic.

Test Example 2

A tensile strength test was performed on the graphene composite plastic prepared from examples 1-6 and comparative example 1. A mechanical property test can intuitively reflect the mechanical properties of the composite exhibited when bearing external loading such as tension, bending and other behaviors. By using Instron 3369 universal material tester, the tensile property test was performed on a starch-based degradable plastic. The specific test method is that the tensile test was performed on a universal material testing machine according to the plastic tensile property test standard GB/T 1040-2006. The tensile rate is 2 mm/min, five tests for each group, and an average value was calculated. The specific test results are shown in Table 2. The tensile strength is calculated according to the following formula.

$$\sigma_t = \frac{F}{b \times h}$$

In the formula: tensile strength, MPa:

F: maximum load. N;

b: sample width, mm;

h: sample thickness, mm.

TABLE 2

Test result table of tensile strength

|  | Tensile strength MPa |
|---|---|
| Example 1 | 34.9 |
| Example 2 | 36.3 |
| Example 3 | 33.8 |
| Example 4 | 35.1 |
| Example 5 | 35.7 |
| Example 6 | 35.6 |
| Comparative Example 1 | 19.5 |

It can be seen from Table 2 that the graphene has a perfect two-dimensional crystal structure, and its lattice is a hexagon surrounded by six carbon atoms. Therefore, the addition of the graphene to the composite plastic can greatly improve the mechanical properties of composite plastic. However, since the graphene is poor in dispersion, the graphene polymer can be uniformly filled in the polypropylene matrix after the graphene is modified with 1-vinyl-3-butyl imidazolium tetrafluoroborate, which is conducive to further improving the tensile strength of the composite plastic.

Test Example 3

Performance test was performed on the graphene composite plastic prepared from examples 1-6 and comparative example 1 after being stabilized for 48 h under the conditions of 25° C. and 50% relative humidity. The thermal conductivity test standard is ISO 22007-3-2012; the conductivity test standard is ISO 08031-2009. The test results are seen in Table below.

TABLE 3

Test results of heat conductivity/conductivity

|  | Heat conductivity W/(m · K) | Conductivity S/cm |
|---|---|---|
| Example 1 | 4.9 | 4.5 |
| Example 2 | 5.8 | 5.2 |
| Example 3 | 3.8 | 3.6 |
| Example 4 | 5.5 | 4.8 |
| Example 5 | 5.6 | 4.9 |
| Example 6 | 5.6 | 4.8 |
| Comparative Example 1 | 2.1 | 1.7 |

It can be seen from Table 3 that 1-vinyl-3-butyltimidazoletetrafluoroborate is combined with graphene through in-situ free radical polymerization and attached to the surface of graphene, which can prevent graphene particles from accumulating during the preparation of composite plastics, while maintaining the integrity of the surface structure of the graphene and improving the thermal conductivity of the composite plastic. It is found that after the combination of 1-vinyl 3-butyl imidazolium tetrafluoroborate and graphene, further treatment of graphene polymer with $NaNO_2$ and p-aminobenzenesulfonic acid can improve the thermal conductivity of the composite plastic.

What is claimed is:

1. A graphene composite plastic for heat dissipation, comprising the following raw materials: 50%-60% of carrier resin, 30%-40% of modified graphene, 4%-7% of lubricant, 2%-4% of coupling agent and 3%-6% of stabilizer;
    wherein the modified graphene is prepared by the following method:
    S1, dissolving 20-30 mol of 1-vinyl-3-butyl imidazole tetrafluoroborate and 0.4-0.6 mmol of azobisisoheptonitrile into 600-800 mL of N,N-dimethylformamide, heating to 75-80° C. in an argon atmosphere, then condensing and refluxing, stirring for 20-24 h for polymerization reaction, adding 50-100 mL of acetone after the reaction is completed, centrifuging, filtering, and collecting precipitates to obtain a polymer;
    S2, dispersing 10-80 g of graphene into 30-40 L of N,N-dimethylformamide and performing ultrasonic treatment for 10-15 min, then adding 1-3 g of the polymer prepared in step S1 and performing ultrasonic treatment for 20-30 min, then adding 12-15 mg of azobisisoheptonitrile, heating to 65-75° C., reacting for 20-24 h, centrifuging after the reaction is ended, filtering, collecting solids, washing with water and then drying to obtain a graphene polymer; and
    S3, adding 10-12 L of water into the graphene polymer prepared in step S2, performing ultrasonic treatment for 25-30 min to obtain a graphene polymer suspension; dissolving 1.1-1.3 g of $NaNO_2$ into 1.2-1.5 L of water, cooling to 0-5° C., adding 2.8-3.2 g of p-aminobenzenesulfonic acid and 50-80 mL of 0.5-1 mol/L HCl solution before mixing with the graphene polymer suspension, reacting for 2-3 h in ice water bath, reacting for another 2-3 h at room temperature, centrifuging for 5-8 min at 10000-12000 rpm after reaction is completed, washing the solid with water to neutral so as to obtain the modified graphene;
    wherein the carrier resin is a polypropylene resin.

2. The graphene composite plastic of claim 1, wherein the lubricant is stearic acid or paraffin.

3. The graphene composite plastic of claim 1, wherein the coupling agent is γ-(2,3-epoxypropoxy)propyltrimethoxysilane or isobutyl triethoxysilane.

4. The graphene composite plastic of claim 1, wherein the stabilizer is dibasic lead phosphite.

5. The graphene composite plastic of claim 1, wherein the graphene composite plastic is prepared by: the carrier resin, the modified graphene, the lubricant, the coupling agent and the stabilizer are weighed and mixed for 10-15 min at 110-120° C. to obtain a mixture, then the mixture is cooled to 35-40° C. and placed for 36-48 h at room temperature, and subjected to granulation and injection molding to obtain the graphene composite plastic for heat dissipation.

* * * * *